US011353920B2

(12) United States Patent
Lurie et al.

(10) Patent No.: US 11,353,920 B2
(45) Date of Patent: Jun. 7, 2022

(54) LIGHT-DIFFUSING USER INTERFACE SURFACE

(71) Applicant: Avid Technology, Inc., Burlington, MA (US)

(72) Inventors: William J. Lurie, Alamo, CA (US); Charles G. Schmidt, Troutville, VA (US)

(73) Assignee: AVID TECHNOLOGY, INC., Burlington, MA (US)

( * ) Notice: Subject to any disclaimer, the term of this patent is extended or adjusted under 35 U.S.C. 154(b) by 0 days.

(21) Appl. No.: 16/828,253

(22) Filed: Mar. 24, 2020

(65) Prior Publication Data

US 2021/0303026 A1    Sep. 30, 2021

(51) Int. Cl.
G06F 1/16        (2006.01)
G06F 3/041       (2006.01)
G02B 5/02        (2006.01)

(52) U.S. Cl.
CPC ......... G06F 1/1609 (2013.01); G02B 5/0278 (2013.01); G06F 3/0412 (2013.01)

(58) Field of Classification Search
CPC ... G06F 1/1609; G06F 3/0412; G02B 5/0278; G02B 1/14; G02B 5/02; G02B 5/0236; G02B 5/0242; G02B 5/0247; G02B 6/0025; G02B 6/0016; G02B 6/0041; G02B 6/0051; B32B 3/30; B32B 7/023; B32B 2307/40; B32B 2307/408; B32B 2307/414; Y10T 428/24355; Y10T 428/24364; Y10T 428/24479; H05K 5/03
See application file for complete search history.

(56) References Cited

U.S. PATENT DOCUMENTS

| | | | | |
|---|---|---|---|---|
| 8,033,706 B1 * | 10/2011 | Kelly | ............... | G02F 1/133606 362/607 |
| 2011/0194305 A1 * | 8/2011 | Chen | ..................... | G09F 13/18 362/606 |
| 2011/0249939 A1 * | 10/2011 | Schmidt | ............... | G02B 6/0055 385/39 |
| 2012/0052929 A1 * | 3/2012 | Thammasouk | ..... | H04M 1/0283 455/575.1 |

(Continued)

OTHER PUBLICATIONS

Avid Venue | S6L, Avid Technology, Inc., https://www.avid.com/products/venue-s6l-system, Dec. 2019, 4 pages.

(Continued)

*Primary Examiner* — Nancy R Johnson
(74) *Attorney, Agent, or Firm* — Oliver Strimpel

(57) ABSTRACT

An overlay surface for a user interface of a device comprises a lower light-diffusing semitransparent layer affixed to an upper transparent layer. Graphics printed on the bottom surface of the transparent layer are protected from wear by the overlying transparent layer, while light sources back-illuminating the graphics from below are diffused by the semitransparent layer before they reach the graphics. The graphics of the surface may be provided by an opaque mask having transparent or translucent cutouts. The multilayer surface enables the graphics to be evenly back-illuminated while at the same time being protected from external wear without the need for additional light-diffusing elements such as light pipes.

9 Claims, 2 Drawing Sheets

(56) References Cited

U.S. PATENT DOCUMENTS

2017/0123137 A1* 5/2017 Kimura ................. H01L 25/048
2019/0049650 A1* 2/2019 Keranen ............... G02B 6/0021
2020/0369223 A1* 11/2020 Hansen ................. B60K 37/00
2021/0252828 A1* 8/2021 Eitel ........................ B32B 5/26

OTHER PUBLICATIONS

Design Mark Product Informarton:Graphic Overlays: https://www.design-mark.com/wp-content/uploads/2019/04/graphic-overlays-6-questions-infographic.pdf, Apr. 3, 2019, 10 pages.
Ideal Jacobs Product Information: Graphic Overlays: https://www.idealjacobs.com.cn/Graphic-Overlay, 2020, 7 pages.
Maverick Label Product Information: Control Panel Graphic Overlays: https://www.mavericklabel.com/products/graphic-overlay.html, May 6, 2019, 6 pages.
Techprint Inc. Graphic Overlays Product Information, 2020, 5pages.

* cited by examiner

LIGHT-DIFFUSING USER INTERFACE SURFACE

BACKGROUND

Electronic devices often use overlays to provide a cosmetic and protective surface layer that displays static and/or illuminated graphics. Overlays are typically constructed from a translucent plastic sheet that is silk-screened on the upper surface, lower surface, or both. When silk-screened on the upper surface, the overlay material does not affect the clarity of the silk-screening, but the graphics are vulnerable to wear since they are exposed to the environment and the user's fingers. Alternatively, when silk-screened on the lower surface, the graphics are protected from wear, but any light-diffusing properties or opacity of the overlay material reduces the clarity and visibility of the graphics. If the overlay material is optically clear, it achieves both protection and high visibility of the graphics, but there is no diffusion of light from back-illuminating light sources, resulting in unevenly lit graphics that may be hard to decipher and look unattractive. With current overlays, diffusion may be provided by light pipes placed between the light sources and the overlays so that the light is uniform when it is incident on the overlay. However, light pipes increase the overall cost significantly. Diffusion may also be provided by printing a light-diffusing pattern or texture onto a surface of the overlay, but surface printing does not diffuse light as effectively as light pipes and are not considered satisfactory for most applications.

There is a need for a low-cost user interface overlay with clear and uniformly lit graphics that are protected from external wear.

SUMMARY

In general, an overlay for a user interface of a device comprises two layers—a semitransparent, light-diffusing layer, and a transparent protective layer. The overlay graphics are sandwiched between the two layers, either as printed graphics on the surface of the transparent layer adjacent to the semitransparent layer, or as a mask with cutouts.

In general, in one aspect, a device user interface surface comprises: a transparent layer having a first surface exposed to an environment external to the device; static graphics applied to a second surface of the transparent layer that is not exposed to the environment external to the device; and a semitransparent layer having light-diffusive properties, wherein a first surface of the semitransparent layer is held in contact with the second surface of the transparent layer, and wherein light from one or more light sources is incident on a second surface of the semitransparent layer, such that the light is diffused by the semitransparent layer when incident on the graphics.

Various embodiments include one or more of the following features. A user of the device interacts with the device via physical contact with the first surface of the transparent layer. A user of the device interacts with the device via physical contact with an area adjacent to the first surface of the transparent layer. The first surface of the semitransparent layer is held in contact with the second surface of the transparent layer by an adhesive layer placed on the bottom surface of the second surface of the transparent later. A portion of the surface is embossed; and in response to a user of the device pressing the embossed portion, the embossed portion flexes to actuate a control of the device located below the embossed portion.

In general, in another aspect, a device user interface surface comprises: a transparent layer having a first surface exposed to an environment external to the device and a second surface that is not exposed to the environment external to the device; an opaque mask layer that includes cutouts having a first surface held in contact with the second surface of the transparent layer; and a semitransparent layer having light-diffusive properties, wherein a first surface of the semitransparent layer is held in contact with a second surface of the mask layer, and wherein light from one or more light sources is incident on a second surface of the semitransparent layer, such that the light is diffused by the semitransparent layer when incident on the mask layer.

Various embodiments include one or more of the following features. A user of the device interacts with the device via physical contact with the first surface of the transparent layer. A user of the device interacts with the device via physical contact with an area adjacent to the first surface of the transparent layer. The first surface of the semitransparent layer is held in contact with the second surface of the transparent layer by an adhesive layer placed on the bottom surface of the second surface of the transparent later.

DETAILED DESCRIPTION

In current user interface surfaces, the overlays consist of a single layer. In some cases, they do not include any means of diffusing light, and in other cases the single layer provides diffusion. In single-layer light-diffusing surfaces, the static user interface graphics are either printed on the bottom of the layer to the detriment of the graphics clarity, or printed on top of the layer, i.e., on the surface touched by the user and exposed to the environment, to the detriment of wear-resistance. The light-diffusing capability is achieved in some cases by making the single layer out of a translucent material, i.e., whose bulk physical texture is diffusive. Examples of suitable translucent sheet materials include but are not limited to polycarbonate, acrylic, and polyester. Certain materials that are somewhat opaque in appearance, such as high density polyethylene (HDPE) and nylon, also have suitable light-diffusing properties if they are thin. Light diffusion may also be achieved by printing a light-diffusing pattern or texture onto a surface of the layer, but if it is printed on the top surface of the overlay, it is vulnerable to wear. When printed on the bottom surface of the overlay, the texture is not subject to wear, but surface-printed textures are insufficient for diffusing light sources that are commonly used under graphics overlays, such as LEDs. In addition, such printed textures often scatter ambient light and can appear bright even when not illuminated, which reduces the impact of the graphics as well as appearing unattractive. Light pipes are commonly used with overlays in order to diffuse the light before it reaches the single-layer overlay. However, the manufacture of light pipes requires additional tooling and additional steps during fabrication and assembly, generally including molding the light pipe frame in a first tool, transferring the frame to a second tool, adding the diffusing material to the frame, and transferring the filled frame to a milling machine to trim excess diffusing material.

As used herein, the terms "overlay" and "user interface overlay" are used interchangeably with "surface" and "user interface surface."

Figure 1:
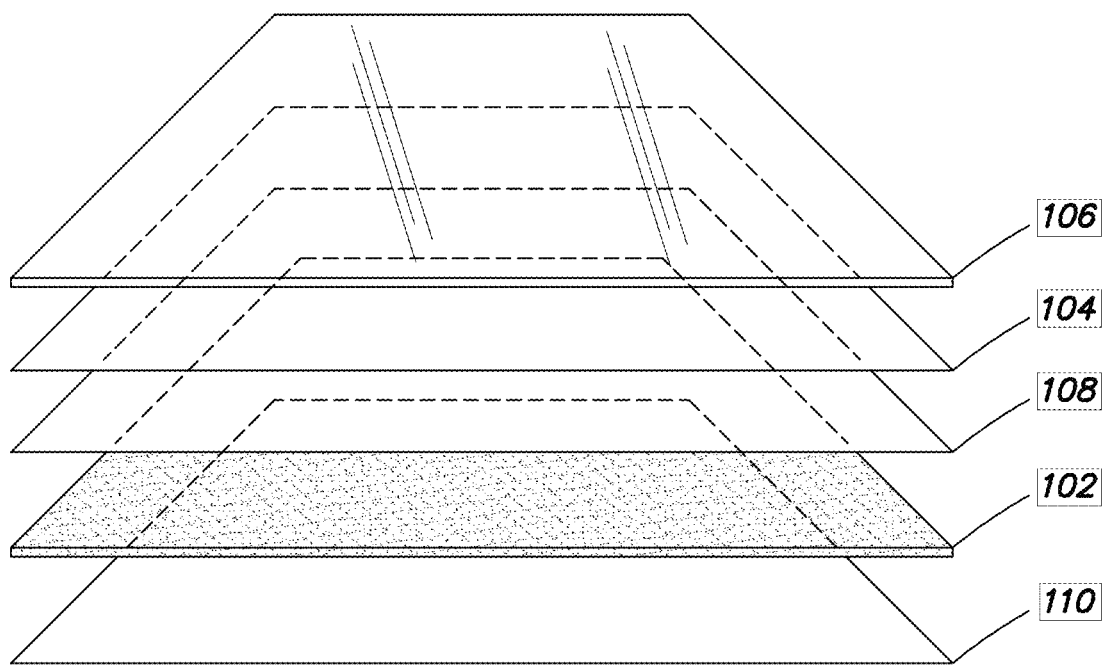
FIG. 1 is simplified diagram of a multilayer overlay showing a transparent layer with graphics placed on its lower surface and light-diffusing layer.

FIG. 1 illustrates a multi-layer user interface overlay in which the protective function and the light-diffusing function are split into separate layers, one for each of these functions. Lower, semi-transparent layer 102 diffuses the light incident from the one or more light sources positioned below the overlay. Graphics 104 are printed onto the lower surface of upper transparent layer 106. The upper surface of transparent layer 106 constitutes the surface exposed to the user and the environment and thus the transparent layer provides a barrier between the exposed surface and the graphics, thus protecting it from wear. Since the upper layer is clear it does not degrade the visibility of the graphics on its lower surface. Light diffusion occurs in layer 102 before the light reaches graphics 104, and thus provides the diffusion required to produce uniform illumination without affecting the clarity of the graphics as seen from above. Transparent layer 106 is held in contact with semitransparent layer 102. This may be achieved by adhesive layer 108, which is applied over the graphics on the bottom surface of transparent layer 106. Alternatively, the layers are held in flush contact by clamping or fastening the overlay into the device. The bottom surface of the diffusing layer may have adhesive layer 110 for affixing the overlay to the device, or alternatively the overlay is held in place by fasteners, clamps, or other mechanical means.

In various implementations, semi-transparent layer 102 is made of one of a variety of plastics including but not limited to polycarbonate, acrylic, nylon, polyester, and HDPE. Semi-transparent layers having thicknesses of 0.25 mm, 0.50 mm, or thicker, ranging up to as much as 5 mm may be used to diffuse light effectively in overlays. The light diffusion may occur within a surface layer of the semi-transparent layer created as part of the material's manufacturing process. Transparent layer 106 comprises an optically clear layer, also made of a plastic, including but not limited to polycarbonate, acrylic, or other clear material such as glass. As with the light-diffusing layer, the thickness of the transparent layer may range from 0.25 mm to 5 mm. Graphics 104 may be directly printed onto the lower surface of the transparent layer or may be silk-screened onto it.

A multi-layer hybrid overlay eliminates the need for the light pipe used in prior devices. This reduces the tooling requirements, the number of steps required during fabrication, and the final part count, thus significantly lowering the cost of the hybrid overlay as compared to prior overlays capable of providing uniformly lit, wear-resistant and clear graphics. Rather than the three steps required to manufacture a light pipe as described in the above example, only a single step to make an isolation frame that prevents a light source from bleeding into an adjacent graphical element is required.

In certain implementations, overlay graphics 104 is provided by one or more opaque masks sandwiched between transparent layer 106 and the semitransparent layer 102. The masks may substitute for the printed graphics entirely, or may be used in conjunction with printed graphics, with some features of the overlay created by a mask, and others by graphics printed onto the lower surface of the transparent layer. For example, if the graphical element consists of black sections surrounding clear or translucent portions, the overlay may be fabricated with an opaque black sheet that has cutouts for the clear or translucent sections.

Figure 2:
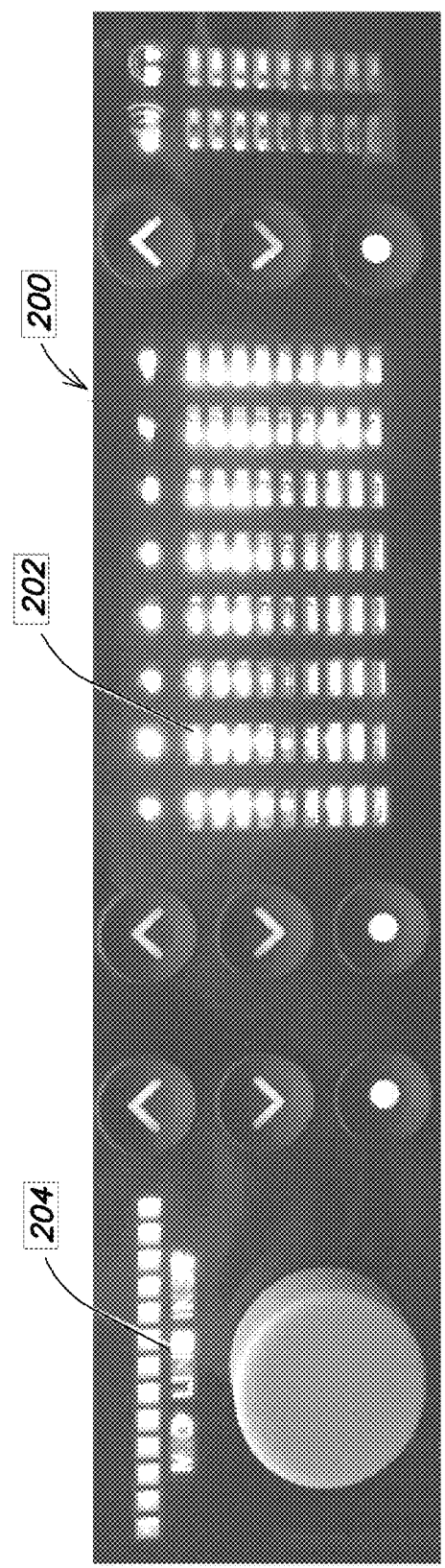
FIG. 2 is a prior art overlay without light diffusion.
Figure 3:
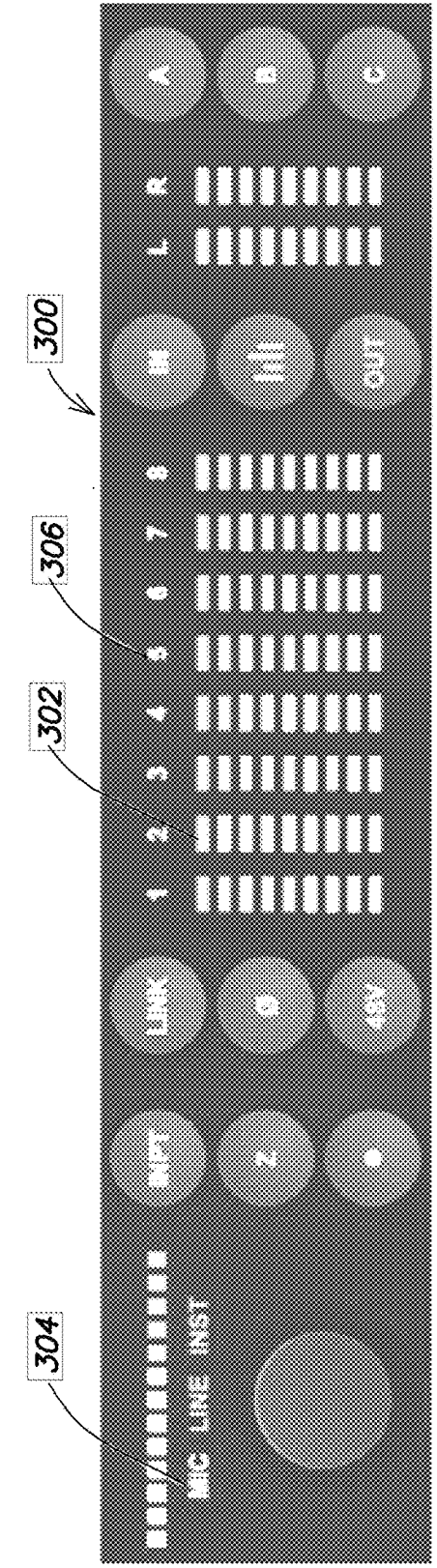
FIG. 3 is a rendering of a device overlay comprising a multilayer overlay providing uniform illumination and wear-resistant graphics.

FIG. 2 illustrates prior art overlay 200 which does not include a light-diffusing element. Each of the indicators, such as indicator 202, or text characters 204 are back-illuminated by LEDs. As the figure shows, the illumination within each of the indicators and text characters is uneven with distracting hot spots. FIG. 3 illustrates overlay 300 which includes a semitransparent light-diffusing layer on the inner side of the overlay. As with overlay 200, each indicator is lit with an individual LED, but in multilayer overlay 300, the light-diffusive properties of the semitransparent layer cause each indicator, such as meter level indicator 302, text 304, and channel number 306 to appear uniformly lit.

The described multilayer overlays may be used as part of an interactive user interface which experiences direct interaction as part of a touch control in the form of a button, switch, or slider. In another application, they are used to form a detent that is embossed to provide relief, and which flexes to provide haptic feedback when pressed while actuating a switch located below. For embossed controls, a thin overlay may be required in order to provide an appropriate level of resistance, for example with each of the semitransparent and transparent layers being 0.125 mm thick, resulting in an overall overlay thickness of 0.25 mm. The overlays may also be used in areas adjacent to active areas of a user interface, since these are also subject to wear. Examples include palm rests next to the physical knobs, switches, and faders comprising the channel controls of an audio control surface, or the areas containing graphics immediately surrounding the physical controls which may be brushed by a user's hands or fingers while these controls are operated. The overlays may similarly be used in areas adjacent to touch controls that may also receive wear as an indirect consequence of the user touching or pressing the surface to actuate the touch controls.

The described multilayer overlay may be used in any electronic device with a user interface, including audio and video processing devices including electronic instruments and audio control surfaces, medical instruments, and vending kiosks. As indicated above, the overlay may display wear-resistant, uniformly lit, and clear graphics within the touched position of the user interface, or in areas adjacent to the controls themselves that may still be subject to wear.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A multilayer overlay for at least one of a video processing device and an audio processing device, the multilayer overlay comprising:
    a transparent layer having a first surface exposed to an environment external to the device;
    static graphics applied to a second surface of the transparent layer that is not exposed to the environment external to the device;
    a diffusive layer having intrinsic bulk light-diffusive properties and first and second planar surfaces, wherein the first planar surface of the diffusive layer is held in contact with the second surface of the transparent layer, and wherein when light from one or more light sources external to the diffusive layer is incident on the second planar surface of the diffusive layer, the light is diffused by the diffusive layer when incident on the graphics of the transparent layer, and wherein the diffusive layer has a uniform thickness between 0.5 mm and 5 mm; and wherein:

the at least one of a video processing device and an audio processing device includes a physical user control;

the static graphics define a portion of an illuminated user interface located adjacent to the physical user control; and the portion is subject to physical wear when the physical user control is operated by a user of the device.

2. The surface of claim 1, wherein the first surface of the diffusive layer is held in contact with the second surface of the transparent layer by an adhesive layer placed on the second surface of the transparent layer.

3. The surface of claim 1, wherein:

a portion of the overlay is embossed;

the at least one of a video processing device and an audio processing device includes a control located below the embossed portion of the overlay; and the embossed portion of the overlay is configured to respond to a user of the device pressing the embossed portion by flexing and to thereby actuating the control of the device located below the embossed portion.

4. A multilayer overlay for at least one of a video processing device and an audio processing device, the multilayer overlay comprising:

a transparent layer having a first surface exposed to an environment external to the device and a second surface that is not exposed to the environment external to the device;

an opaque mask layer that includes cutouts having a first surface held in contact with the second surface of the transparent layer;

a diffusive layer having intrinsic bulk light-diffusive properties and first and second planar surfaces, wherein the first planar surface of the diffusive layer is held in contact with a second surface of the mask layer, and wherein when light from one or more light sources is incident on the planar second surface of the diffusive layer, the light is diffused by the diffusive layer when incident on the mask layer, and wherein the diffusive layer has a uniform thickness between 0.5 mm and 5 mm; and wherein:

the at least one of a video processing device and an audio processing device include a physical user control;

the mask layer defines a portion of an illuminated user interface located adjacent to the physical user control; and the portion is subject to physical wear when the physical user control is operated by a user of the device.

5. The overlay of claim 4, wherein the first surface of the diffusive layer is held in contact with the second surface of the transparent layer by an adhesive layer placed on the second surface of the transparent layer.

6. The overlay of claim 1, wherein the physical user control is one of a button, switch and slider.

7. The overlay of claim 1, wherein the portion of the illuminated user interface is palm rest.

8. The overlay of claim 4, wherein the physical user control is one of a button, switch and slider.

9. The overlay of claim 4, wherein the portion of the illuminated user interface is palm rest.

* * * * *